(12) United States Patent
Jones

(10) Patent No.: US 6,686,078 B1
(45) Date of Patent: Feb. 3, 2004

(54) METHOD OF REFORMER OPERATION TO PREVENT FUEL CELL FLOODING

(75) Inventor: Daniel O. Jones, Scotia, NY (US)

(73) Assignee: Plug Power Inc., Latham, NY (US)

( * ) Notice: Subject to any disclaimer, the term of this patent is extended or adjusted under 35 U.S.C. 154(b) by 131 days.

(21) Appl. No.: 09/675,417

(22) Filed: Sep. 29, 2000

(51) Int. Cl.$^7$ .............................. H01M 8/04; H01M 8/06
(52) U.S. Cl. .............................. 429/17; 429/20; 429/22; 429/23
(58) Field of Search .............................. 429/17, 19, 20, 429/22, 23, 25

(56) References Cited

U.S. PATENT DOCUMENTS

| | | | |
|---|---|---|---|
| 3,462,308 A | 8/1969 | Winters ........................ | 136/86 |
| 3,976,507 A * | 8/1976 | Bloomfield .................... | 429/17 |
| 4,128,700 A | 12/1978 | Sederquist .................... | 429/17 |
| 4,365,006 A | 12/1982 | Baker ........................... | 429/17 |
| 4,585,708 A | 4/1986 | Abens et al. .................. | 429/17 |
| 4,902,586 A | 2/1990 | Wertheim ..................... | 429/20 |
| 5,192,627 A | 3/1993 | Perry, Jr. et al. .............. | 429/17 |
| 5,330,857 A * | 7/1994 | Sederquist et al. .......... | 205/343 |
| 5,366,821 A * | 11/1994 | Merritt et al. ................. | 429/21 |
| 5,441,819 A | 8/1995 | Voss et al. .................... | 429/13 |
| 5,939,218 A | 8/1999 | Mizuno ........................ | 429/23 |
| 6,007,931 A | 12/1999 | Fuller et al. .................. | 429/13 |
| 6,103,411 A * | 8/2000 | Matsubayashi et al. ....... | 429/17 |
| 6,331,366 B1 * | 12/2001 | Van Dine et al. ............. | 429/17 |

FOREIGN PATENT DOCUMENTS

| | | | | |
|---|---|---|---|---|
| DE | 2604982 | 8/1976 | ............ | H01M/8/04 |
| JP | 57-36784 | 2/1982 | ............ | H01M/8/04 |
| JP | 58-133774 | 8/1983 | ............ | H01M/8/04 |
| JP | 59-184468 | 10/1984 | ............ | H01M/8/06 |
| JP | 60-198065 | 10/1985 | | |
| JP | 60-212968 | 10/1985 | ............ | H01M/8/04 |

\* cited by examiner

*Primary Examiner*—Susy Tsang-Foster
(74) *Attorney, Agent, or Firm*—Heslin Rothenberg Farley & Mesiti P.C.; Jeff Rothenberg, Esq.; Victor A. Cardona, Esq.

(57) ABSTRACT

The present invention provides a method for regulating a supply of reformate to a fuel cell in which the method includes receiving exhaust oxidant from the fuel cell, combining the exhaust oxidant and fuel to form reformate, and providing the reformate to the fuel cell.

26 Claims, 4 Drawing Sheets

METHOD OF REFORMER OPERATION TO PREVENT FUEL CELL FLOODING

TECHNICAL FIELD

This invention relates generally to fuel cells and more particularly to methods and fuel cell systems for regulating a supply of reformate to a fuel cell.

BACKGROUND OF THE INVENTION

Fuel cells electrochemically convert fuels and oxidants to electricity and they can be categorized according to the type of electrolyte (e.g., solid oxide, molten carbonate, alkaline, phosphoric acid, or solid polymer) used to accommodate ion transfer during operation. Moreover, fuel cell assemblies can be employed in many (e.g., automotive to aerospace to industrial to residential) environments, for multiple applications.

A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., H+ions) from the "anode" side of a fuel cell to the "cathode" side of the fuel cell while preventing passage therethrough of reactant fluids (e.g., hydrogen and air/oxygen gases).

Usually, an individual PEM-type fuel cell assembly or stack has multiple, generally transversely extending layers assembled in a longitudinal direction. In the typical fuel cell assembly or stack, all layers which extend to the periphery of the fuel cells have holes therethrough for alignment and formation of fluid manifolds that generally service fluids for the stack. As is known in the art, some of the fluid manifolds distribute fuel (e.g., hydrogen) and oxidant (e.g., air/oxygen) to, and remove unused fuel and oxidant as well as product water from, fluid flow plates having fluid flow channels.

As is known in the art, the PEM can work more effectively if it is wet. Conversely, once any area of the PEM dries out, the fuel cell does not generate any product water in that area because the electrochemical reaction there stops. Undesirably, this drying out can progressively march across the PEM until the fuel cell fails completely. To avoid this, the fuel and oxidant fed to each fuel cell are usually humidified.

In addition to it being undesirable for a fuel cell to dry out, it is also undesirable for fuel cells to flood. In residential use of fuel cells, less electrical demand at off-peak times can yield lower flow rates, of reactant fluids which may result in the accumulation of water in the fluid flow channels. One method of removing accumulated water from the fluid flow channels is to temporarily increase the flow rate of reactant fluids (e.g., reactant fuel) and air to sweep the water away and then return to an appropriate flow rate. This results in energy (e.g., reactant fuel) being wasted in order to remove water from the flow channels.

Thus, there is a need for an efficient method and fuel cell system which inhibits the flooding of fuel cells particularly in periods of low electrical demand.

SUMMARY OF THE INVENTION

The present invention provides, in a first aspect, a method for regulating a supply of reformate to a fuel cell in which the method includes receiving exhaust oxidant from the fuel cell, combining the exhaust oxidant and fuel to form reformate, and providing the reformate to the fuel cell.

The present invention provides, in a second aspect, a fuel cell system which includes a fuel cell, a reformer for forming reformate for use in the fuel cell, and wherein exhaust oxidant from the fuel cell and fuel are combined to form the reformate.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

Examples of fuel systems for regulating or providing a supply of reformate to a fuel cell which incorporate and use the novel features of the present invention, are depicted in FIGS. 1–4 described in detail herein.

Figure 1:
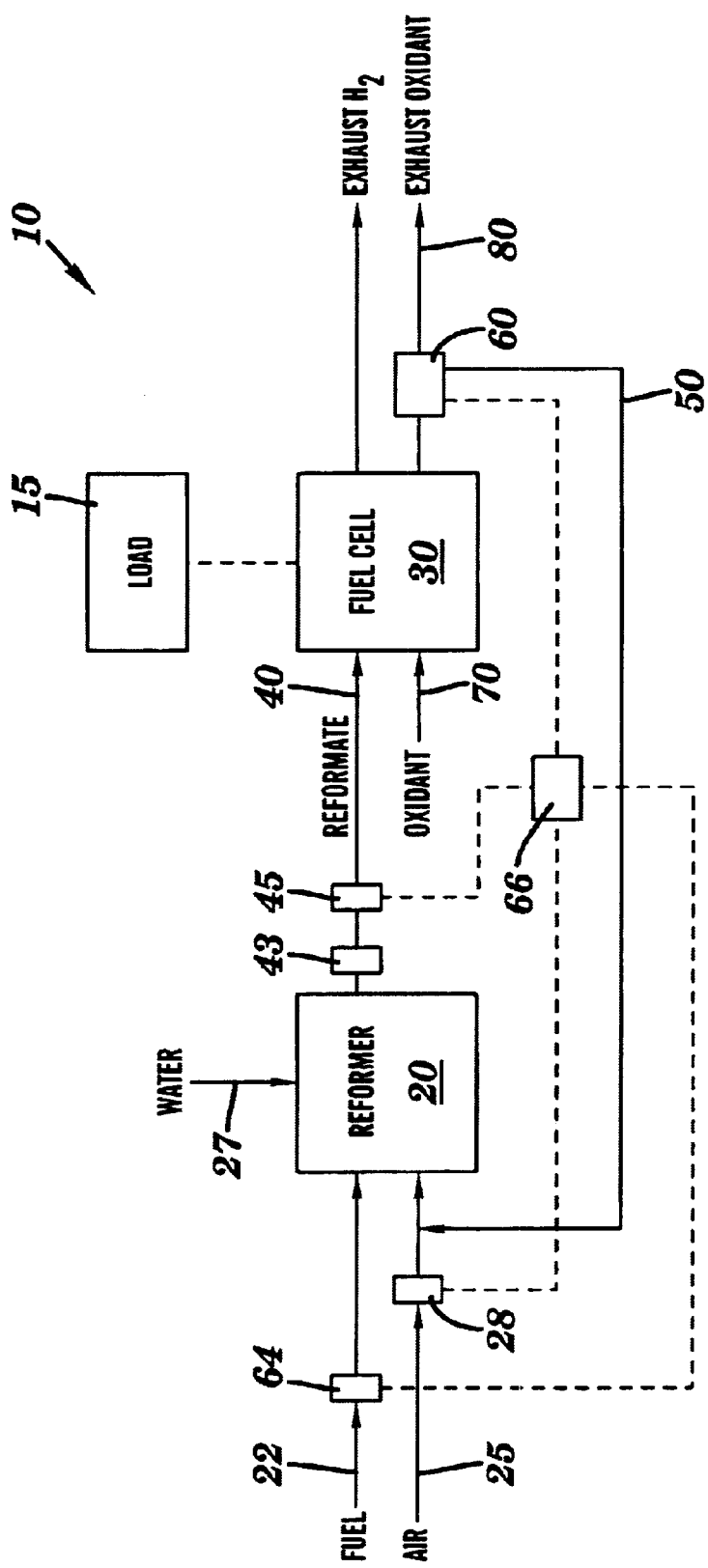
FIG. 1 is a block diagram of a fuel cell system in accordance with a first embodiment of the present invention.

In the exemplary embodiment depicted in FIG. 1, fuel cell system 10 is referred to as the assembled, or complete, system which functionally together with all parts thereof produces electricity, and typically includes a reformer 20 and a fuel cell 30. Reformer 20 is provided with fuel, for example, methane, through a fuel inlet 22, along with water through a water inlet 27 and air, for example, atmospheric air, through a reformer air inlet 25. The reformer combines the reactants, e.g., catalytic partial oxidation, to form a supply of reformate which is conveyed or communicated, for example, through a reformate conduit 40, to fuel cell 30. Fuel cell 30 may be a Proton Exchange Membrane fuel cell which converts the chemical energy of fuels such as hydrogen and oxidants such as air or oxygen directly into electrical energy and may be a multiple plate fuel cell stack as is described in U.S. Pat. No. 6,071,635 issued to Carlstrom entitled "Easily-Formable Fuel Cell Assembly Fluid Flow Plate Having Conductivity and Increased Non-Conductive Material" the entire contents of which are incorporated herein by reference. The electricity produced may be used to meet an electrical demand, for example, that of a residential house or building 15.

Fuel cell 30 may receive a supply of reformate, as noted, and an influent oxidant, such as air or oxygen, through fuel cell oxidant inlet 70. An oxidant exhaust is produced in a cathode portion of the fuel cell resulting in a decreased amount of oxygen compared to the influent oxidant. For example, the influent oxidant input at a fuel cell oxidant inlet 70 may be atmospheric air containing about 21 percent oxygen at sea level and the exhaust oxidant may contain about 10–15 percent oxygen by volume.

This exhaust oxidant having a reduced oxygen content compared to ambient air is conveyed via oxidant return conduit 50 to reformer 20 where it may be substituted for, mixed with, or added to atmospheric air at reformer air inlet 25. When the fuel cell system is first turned on, atmospheric air by itself may be initially inputted to reformer 20. An oxidant regulator 60 desirably regulates (as controlled by a controller 66) the flow of exhaust oxidant to reformer 20 through oxidant return conduit 50 or to oxidant waste conduit 80.

As described above, low electrical demand may result in low flow rates of reactant fluids, such as fuel and oxidant, through the fuel cell. Such a reduction in flow rate of reactant fluids may result in an accumulation of water or flooding in flow channels 310 (FIG. 3) of fuel cell 30 which may cause some of flow channels 310 to become blocked and cease to function which may result in decreased efficiency of fuel cell 30.

Substituting or adding exhaust oxidant from the fuel cell for atmospheric air to the reformer results in a reduction in the content of oxygen entering reformer 20 per unit time. Thus, the flow rate of the reduced oxygen content oxidant to the reformer can be increased to result in an equivalent amount of oxygen, per unit time, compared to solely atmospheric air at a lower flow rate. This increased flow rate of exhaust oxidant may be combined or reacted with a desired flow rate of a fuel, for example methane, to produce an increased reformate flow rate exiting reformer 20 and entering fuel cell 30, albeit with a reduced hydrogen content. This relative increase in reformate flow rate inhibits the accumulation of water in flow channels 310 (FIG. 3) of fuel cell 30 and, thus, prevents the decreased efficiency which may result from one or more cells of fuel cell 30 ceasing to function due to flooding. Further, because the fuel and the amount of oxygen entering reformer 20, per unit time, are equivalent before and after the introduction of exhaust oxidant due to the increased flow rate, fuel cell 30 produces an equal amount of electrical current per unit time.

A fuel sensor 64 located in fuel inlet 22 may determine whether the flow rate of fuel is at a relatively low level due to low electrical demand such that there is a danger of fuel cell flooding. Fuel sensor 64 may be coupled or operatively connected to controller 66, e.g., a microprocessor, which may be operatively connected to oxidant regulator 60. Controller 66 may cause oxidant regulator 60 to divert exhaust oxidant to oxidant return conduit 50, and thus to reformer air inlet 25, due to such a low fuel flow rate detected by fuel sensor 64. Controller 66 may also be operatively connected to a reformer air inlet regulator 28, and may cause reformer air inlet regulator 28 to close reformer air inlet 25 from drawing in atmospheric air after controller 66 causes oxidant regulator 60 to divert exhaust oxidant through oxidant return conduit 50 to replace the air. This diversion may then make it desirable for increased exhaust oxidant flow, as described, to maintain the given amount of electrical current. Controller 66 may also cause reformer air inlet regulator 28 to mix atmospheric air and exhaust oxidant.

In another aspect, a reformate flow sensor 43 and a reformate flow regulator 45 may be operatively connected with controller 66 to cause reformate flow regulator 45 to regulate the amount of reformate flowing from reformer 20 to fuel cell 30. Also, controller 66 may further be operatively connected to oxidant regulator 60, fuel sensor 64, and/or reformer air inlet regulator 28 to control an amount of reformate formed in reformer 20 based on a flow of reformate as detected by reformate flow sensor 43 or detected by an electrical demand sensor on fuel cell 30 detecting the electrical demand by load 15. Load 15 may be a building, automobile or other device which utilizes electricity.

As noted, the use of exhaust oxidant in the reformer, or a mix of exhaust oxidant and atmospheric air, instead of atmospheric air by itself, may result in an increased flow rate of oxidant in the reformer. This is desirable to achieve an equivalent amount of oxygen, per unit time, for reaction with a given amount of fuel, per unit time. One result of this increased flow rate may be a decrease in the temperature of reformer 20 which may be undesirable for optimal reformate formation. To increase the temperature to acceptable levels, the flow rate of influent exhaust oxidant and/or atmospheric air may be further increased to raise the relative percentage of oxygen above that percentage used to react with the fuel prior to the introduction of the exhaust oxidant. Thus, the temperature of the reformer may be increased through increased oxidation of fuel due to the increased oxygen content in the flow of air/oxidant in the reformer.

Figure 2:
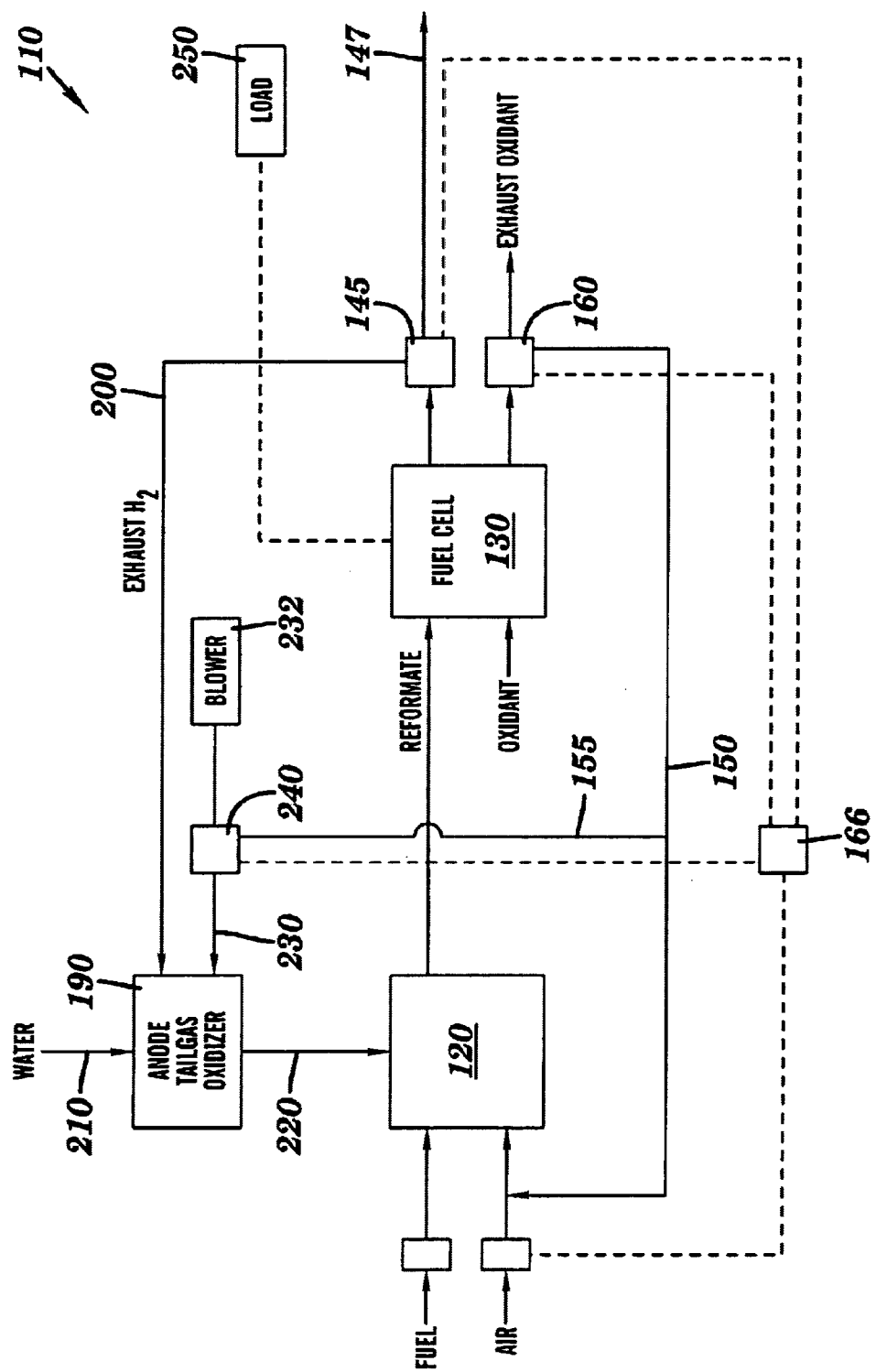
FIG. 2 is a block diagram of a second embodiment of a fuel cell system in accordance with the present invention.
Figure 3:
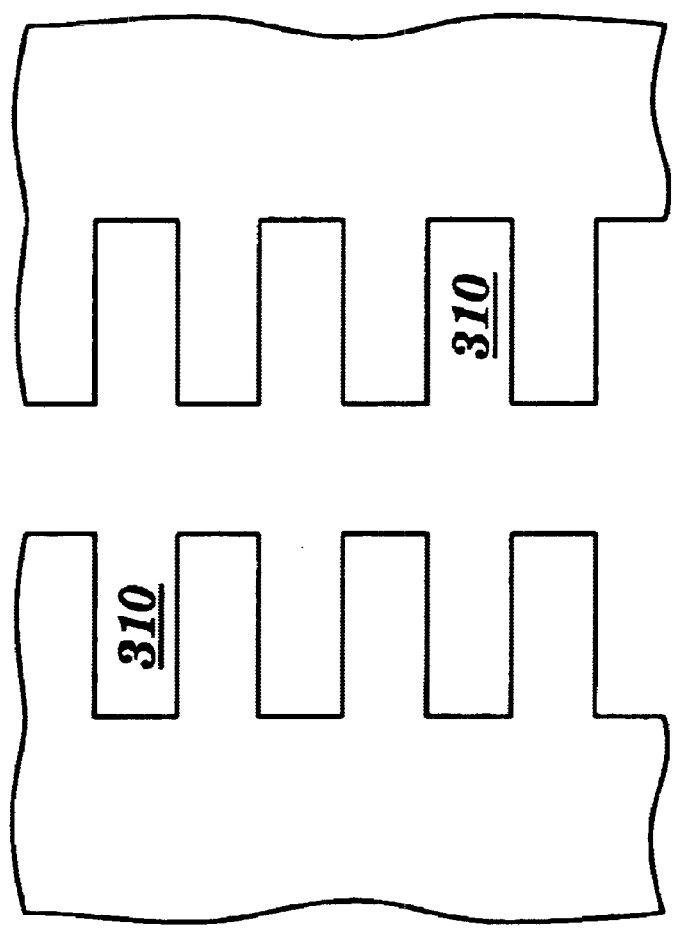
FIG. 3 is a cross sectional view of a portion of a fluid flow plate of the fuel cell of FIG. 1 and FIG. 2.

In another aspect of the present invention, illustrated in FIG. 2, a fuel cell system 110 includes a reformer 120, a fuel cell 130, and an anode tail gas oxidizer 190, which may provide electricity for a load 250 which might be a residential house, a building, an automobile or other electricity consuming device. At the anode exhaust end of fuel cell 130, un-oxidized reformate may remain. For example, one hundred twenty percent of the reformate needed per unit time may be supplied to fuel cell 30, thus resulting in an excess over one hundred percent being exhausted, e.g. the remaining 20 percent. Anode tail gas oxidizer 190 may receive this exhaust fuel from the anode portion of fuel cell 130 via exhaust fuel conduit 200. Anode exhaust regulator 145 regulates a portion of exhaust reformate which is conveyed to reformate waste conduit 147 and exhaust fuel conduit 200. A controller 166 may be operatively connected to and may control anode exhaust regulator 145.

Anode tail gas oxidizer 190 oxidizes exhaust reformate containing un-oxidized fuel, for example, excess hydrogen. The heat from this oxidation may be used to heat water which may be conveyed to anode tail gas oxidizer via a water influent conduit 210. The heated water or steam may then be conveyed via a water exhaust conduit 220 to reformer 120 where it may be utilized in the formation of reformate.

Exhaust oxidant from fuel cell 130 may also be conveyed from an oxidant return conduit 150 to anode tail gas oxidizer 190 via a second oxidant return conduit 155, for example. Controller 166, an oxidant regulator 160, and an anode tail gas oxidizer air regulator 240 may be operatively connected. Controller 166 may cause oxidant regulator 160 and anode tail gas oxidizer air regulator 240 to divert a portion of this pressured stream of exhaust oxidant to replace, add to, or mix with atmospheric air which may enter through air entry conduit 230. Since a blower 232 is typically necessary to cause the entry of air through air entry conduit 230, the use of the pressurized flow stream of exhaust oxidant from fuel cell 130 in lieu of atmospheric air may result in increased efficiency due to saving the energy required to power blower 232.

Figure 4:
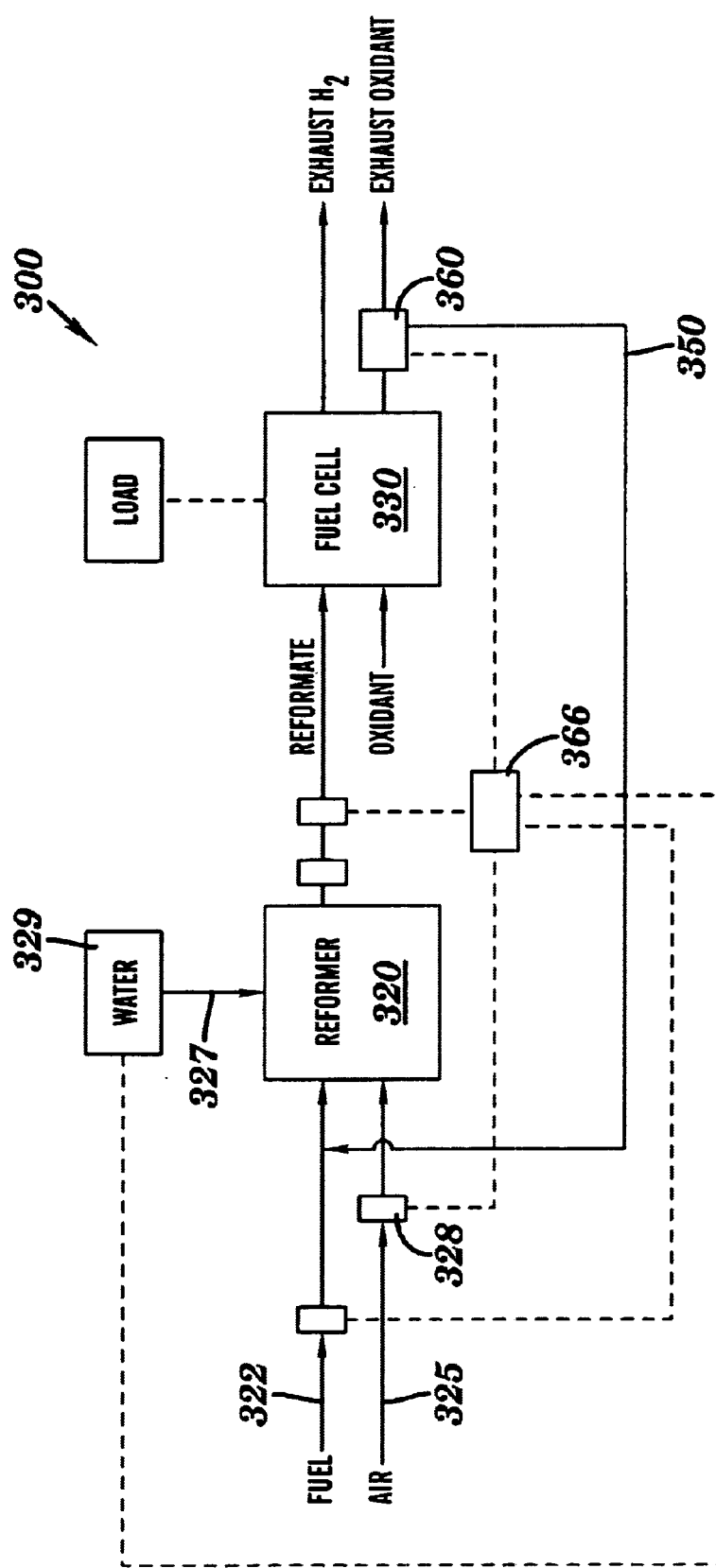
FIG. 4 is a block diagram of a third embodiment of a fuel cell system in accordance with the present invention.

An additional benefit of the present invention is that the cathode exhaust gas is humidified compared to the input oxidant. Thus, the use of cathode exhaust gas in the reformer may reduce or eliminate the amount of additional water it is necessary to provide to the reformer. As illustrated in FIG. 4, a fuel cell system 300 includes a reformer 320 which may receive exhaust oxidant from a fuel cell 330 via an oxidant return conduit 350. Exhaust oxidant is conveyed via an oxidant return conduit 350 to a fuel inlet 322 where it may be mixed with fuel, for example methane. Air may be input at an air inlet 325 and additional water, if necessary, may be input at a water inlet 327. Controller 366 may be operatively connected to and may control a water regulator 329, an air inlet regulator 328, and an exhaust oxidant regulator 360 to achieve an optimal humidification of air and fuel into reformer 320, known in the art as an optimal steam to carbon ratio.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for supplying reformate to a fuel cell, the method comprising:
    receiving fuel at a reformer at a fuel flow rate;
    receiving a first oxidant flow at the reformer at a first oxidant flow rate;
    combining the fuel and the first oxidant flow to form a first reformate flow;
    providing the first reformate flow to the fuel cell;
    substituting a second oxidant flow for the first oxidant flow at the reformer at a second oxidant flow rate wherein the second oxidant flow comprises exhaust oxidant from the fuel cell, and the second oxidant flow rate differs from the first oxidant flow rate;
    combining the second oxidant flow and the fuel to form a second flow of reformate which substitutes for the first reformate flow; and
    controlling an accumulation of water in the fuel cell by providing the second flow of reformate to the fuel cell.

2. The method of claim 1 further comprising controlling a flow rate of the exhaust oxidant to regulate a ratio of oxygen relative to the fuel per unit time to control accumulation of water in the fuel cell.

3. The method of claim 1 further comprising controlling a flow rate of the second reformate to the fuel cell to control accumulation of water in the fuel cell.

4. The method of claim 1 further comprising controlling at least one of a ratio of the oxygen to the fuel per unit time at the reformer and a flow rate of the second flow of reformate to the fuel cell based on at least one of a flow of the fuel, a flow of the reformate to the fuel cell, and an electrical demand of the fuel cell.

5. The method of claim 1 wherein the combining the second oxidant flow and the fuel comprises combining the fuel, the second oxidant flow, and air.

6. The method of claim 1 wherein the combining the second oxidant and the fuel comprises combining the fuel, the second oxidant flow, air and water.

7. The method of claim 1 further comprising providing at least a portion of the exhaust oxidant from the fuel cell to an anode tail gas oxidizer.

8. The method of claim 7 further comprising providing exhaust reformate from the fuel cell to the anode tail gas oxidizer.

9. The method of claim 1 wherein the combining comprises catalytic partial oxidation to form the reformate.

10. The method of claim 1 wherein the fuel comprises methane.

11. The method of claim 1 wherein the exhaust oxidant comprises less than 21 percent oxygen.

12. The method of claim 11 wherein the exhaust oxidant comprises about 10 percent to about 15 percent oxygen by volume.

13. The method of claim 1 wherein the second oxidant flow rate is greater than the first oxidant flow rate.

14. A fuel cell system comprising:
    a fuel cell;
    a reformer for forming reformate for use in the fuel cell;
    means for providing a first flow of oxidant to said reformer at a first flow rate; and
    means for inhibiting water accumulation in said fuel cell by substituting a second flow of oxidant to said reformer for the first oxidant flow, wherein the second flow has a second flow rate greater than the first flow rate and comprises exhaust oxidant from said fuel cell.

15. The system of claim 14 further comprising a controller for controlling the second flow rate to the reformer to control a ratio of the exhaust oxidant to the fuel per unit time to control accumulation of water in the fuel cell.

16. The system of claim 15 further comprising a regulator operatively connected to the controller for regulating the second flow of the exhaust oxidant to the reformer.

17. The system of claim 16 further comprising at least one sensor operatively connected to the controller to detect at least one of a flow of fuel entering the reformer, a flow of reformate to the fuel cell, and an electrical demand of the fuel cell.

18. The fuel cell system of claim 14 further comprising a controller for controlling a flow rate of the reformate from the reformer to the fuel cell for controlling accumulation of water in the fuel cell.

19. The system of claim 18 further comprising a regulator operatively connected to the controller for regulating the reformate to the fuel cell.

20. The system of claim 19 further comprising at least one sensor operatively connected to the controller to detect at least one of a flow of fuel entering the reformer, a flow of reformate to the fuel cell, and an electrical demand of the fuel cell.

21. The system of claim 14 further comprising an anode tail gas oxidizer for receiving at least one of exhaust reformate and exhaust oxidant from the fuel cell, and for supplying heated water to the reformer.

22. The system of claim 14 wherein the fuel cell comprises a fuel cell stack.

23. The system of claim 14 wherein the fuel cell comprises a proton exchange membrane fuel cell.

24. A method for controlling fuel cell flooding, the method comprising:
    receiving fuel at a reformer at a fuel flow rate;
    receiving a first oxidant flow at the reformer at a first flow rate, the first oxidant flow comprising a first percentage of oxygen;
    combining the fuel and the first oxidant flow to form a first reformate flow;
    providing the first reformate to the fuel cell to produce electricity at a first production rate;
    receiving a second oxidant flow at the reformer at a second flow greater than the first flow rate, the second oxidant flow substituting for the first oxidant flow and comprising a second percentage of oxygen less than the first percentage of oxygen per unit time;
    combining the fuel and the second oxidant flow to form a second flow of reformate;
    controlling an accumulation of water in the fuel cell by providing the second flow of reformate to the fuel cell.

25. The method of claim 24 wherein the receiving a second oxidant flow comprises receiving an exhaust oxidant flow from the fuel cell.

26. A method for supplying reformate to a fuel cell, the method comprising:

receiving fuel at a reformer at a fuel flow rate;

receiving a first oxidant flow at the reformer at a first oxidant flow rate;

combining the fuel and the first oxidant flow to form a first reformate flow;

providing the first reformate flow to the fuel cell;

substituting a second oxidant flow for the first oxidant flow wherein the second oxidant flow comprises exhaust oxidant from the fuel cell;

combining the second oxidant flow and the fuel to form a second flow of reformate which substitutes for the first reformate flow; and controlling an accumulation of water in the fuel cell by providing the second flow of reformate to the fuel cell;

wherein the providing the first reformate to the fuel cell produces electricity at a first production rate and wherein the providing the second reformate flow produces electricity at substantially the first production rate.

* * * * *

UNITED STATES PATENT AND TRADEMARK OFFICE
CERTIFICATE OF CORRECTION

PATENT NO.    : 6,686,078 B1
DATED         : February 3, 2004
INVENTOR(S)   : Jones It is certified that error appears in the above-identified patent and that said Letters Patent is hereby corrected as shown below:

<u>Column 8,</u>
Line 6, insert the word -- flow -- after the word "reformate"

Signed and Sealed this

Sixth Day of April, 2004

JON W. DUDAS
*Acting Director of the United States Patent and Trademark Office*